US006376944B1

(12) United States Patent
Grizzle, Jr. et al.

(10) Patent No.: US 6,376,944 B1
(45) Date of Patent: Apr. 23, 2002

(54) ELECTRICAL POWER GENERATOR

(75) Inventors: Joseph H. Grizzle, Jr., Webb City; Donald R. Whitman, Neosho; Thomas D. Harmon, Noel, all of MO (US)

(73) Assignee: Eagle-Picher Industries, Inc., Cincinnati, OH (US)

(*) Notice: Subject to any disclaimer, the term of this patent is extended or adjusted under 35 U.S.C. 154(b) by 0 days.

(21) Appl. No.: 09/613,890

(22) Filed: Jul. 11, 2000

(51) Int. Cl.[7] .......... H02K 7/14; H02K 9/00; H02P 9/04; F02B 63/00

(52) U.S. Cl. .......... 310/52; 290/1 B; 123/2

(58) Field of Search .......... 310/50, 52, 58, 310/59, 60 R, 89, 113; 290/1 A, 1 B; 123/2, 3, 41.7

(56) References Cited

U.S. PATENT DOCUMENTS

| | | | | |
|---|---|---|---|---|
| 2,543,541 A | * | 2/1951 | Angle | 290/1 A |
| 4,082,967 A | | 4/1978 | Laskaris | 310/64 |
| 4,122,353 A | * | 10/1978 | Noguchi | 290/1 A |
| 4,278,905 A | | 7/1981 | Chari et al. | 310/52 |
| 4,291,997 A | | 9/1981 | Laskaris | 403/24 |
| 4,608,946 A | * | 9/1986 | Tanaka et al. | 123/2 |
| 4,672,252 A | | 6/1987 | Spirk | 310/216 |
| 4,677,940 A | * | 7/1987 | Bracht et al. | 123/2 |
| 4,702,201 A | * | 10/1987 | Odo et al. | 123/2 |
| 4,827,147 A | * | 5/1989 | Mizushima | 290/1 A |
| 4,900,965 A | | 2/1990 | Fisher | 310/216 |
| 4,912,350 A | | 3/1990 | Parshall et al. | 310/217 |
| 4,924,198 A | | 5/1990 | Laskaris | 335/216 |
| 4,986,078 A | | 1/1991 | Laskaris | 62/51.1 |
| 5,034,713 A | | 7/1991 | Herd et al. | 335/216 |
| 5,097,163 A | | 3/1992 | Shah et al. | 310/51 |
| 5,212,419 A | | 5/1993 | Fisher et al. | 310/254 |
| 5,323,077 A | | 6/1994 | Brandes | 310/156 |
| 5,554,902 A | | 9/1996 | Kessens et al. | 310/254 |
| 5,642,702 A | * | 7/1997 | Kouchi et al. | 123/198 E |
| 5,899,174 A | * | 5/1999 | Anderson et al. | 123/2 |
| 5,977,667 A | * | 11/1999 | Hirose | 310/51 |
| 5,990,575 A | | 11/1999 | Flaugher | 307/23 |

* cited by examiner

*Primary Examiner*—Nestor Ramirez
*Assistant Examiner*—Dang Dinh Le
(74) *Attorney, Agent, or Firm*—Wood, Herron & Evans

(57) ABSTRACT

A backup power supply includes a housing with a central compartment holding an electrical generator preferably an alternator and a hydrocarbon powered motor. The housing further includes first and second side compartments. The first side compartment stores the electronic components of the generator. A top covers all three compartments and has two side overhangs and a forward overhang. The side overhangs provide air inlets to the two side compartments which in turn permit passage of air into the central compartment. The forward overhang includes an air outlet which allows air to be directed from the central compartment to outside the housing. The alternator itself includes a fan which pulls air from one side compartment into the central compartment. The motor has a second fan that pulls air into the central compartment from the second side compartment. Further the exhaust from the motor is encased in a shroud which leads directly to a passage through the top to the forward outside opening. This provides for superior cooling of the alternator and motor as well as the electrical components and at the same time prevents water from getting into the interior of the housing.

12 Claims, 2 Drawing Sheets

ELECTRICAL POWER GENERATOR

FIELD OF THE INVENTION

Many electrical systems require backup electrical power supplies. These may include phone equipment, land based and cellular, as well as hospitals, police stations and the like. There are electrical power generators that run on gasoline, diesel fuel or natural gas. These usually include an engine which rotates an electrical generator either an alternator or a generator. Generally an alternator is used. Since these are powered by hydrocarbon fuel sources, they must be properly vented and cooled. Many of these units are designed to be permanently located outside of any building and therefore require proper housing.

The present invention is premised on the realization that such a device with a housing suitable for outdoor use can be prepared wherein the housing has three compartments. A central compartment houses the motor and alternator and two side compartments hold the electric components and the start-up batteries. Air flows through the two side compartments into the central compartment. The exhaust from the engine is vented from the top through an overhang portion. Likewise the inlets into the first and second side compartments are from overhangs in the top of the housing preventing water from getting into the interior of the housing.

These provide effective backup power and can be used under extreme environmental conditions without destruction of the electrical components, motor or alternator. The present invention will be further appreciated in light of the following detailed description of drawing in which:

DETAILED DESCRIPTION

Figure 1:
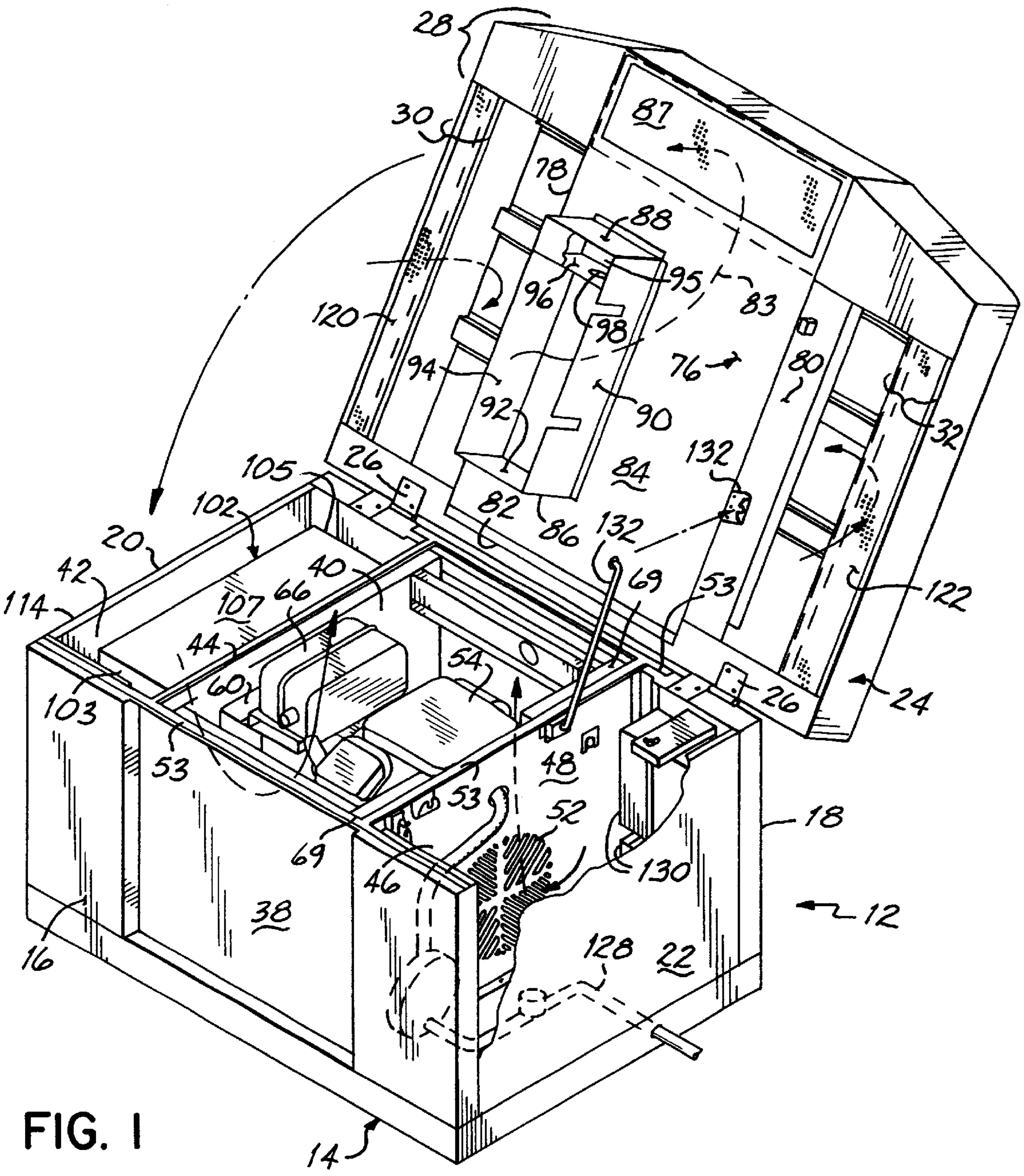
FIG. 1. is a perspective view of the present invention partially broken away.
Figure 2:
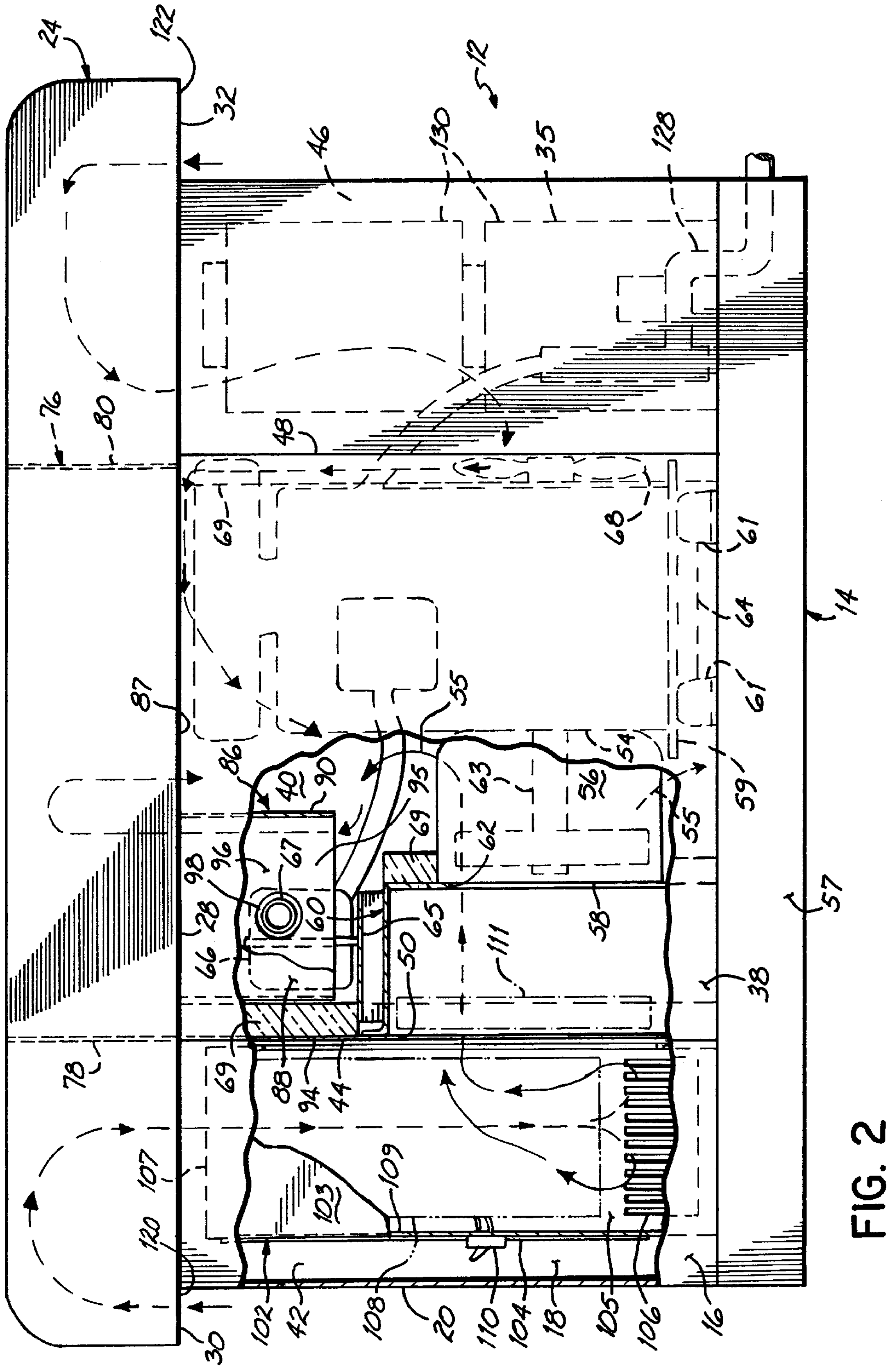
FIG. 2 is a front elevational view partially broken away.

As shown in the figures, the present invention is a backup electrical power generator 12 which includes a housing 14. The housing includes a front wall 16, a back wall 18, first side wall 20 and second side wall 22. These are all covered by the top or roof 24 which is attached to the back wall 18 by hinges 26. The roof 24 has a front overhang 28 that extends beyond the front wall 16. Likewise it includes a first side overhang portion 30 which extends beyond the first side wall 20 and a second side overhang portion 32 which extends beyond the second side 22.

The front wall 16 has a central access door 38 which can be removed to provide access to a central compartment 40. Central compartment 40 is adjacent a first side compartment 42 separated by first inner wall 44. It is also adjacent a second side compartment 46 separated by a second inner wall 48. First inner wall 44 and second inner wall 48 communicate with the central compartment 40 by openings 50 and 52 respectively.

A gasket 53 is placed along the top edge of compartment 40 and partially along the top edge of compartments 42 and 46 to seal off the compartments one from another when the hinged roof 24 is closed down onto gasket 53.

Located within the central compartment is a motor 54 and an electrical power generator 56 which can either be an alternator or generator. Hereinafter this is simply referred to as an alternator but the term is intended to include any device which would generate electrical energy. The alternator 56 is preferably a low profile generator such as disclosed in U.S. Pat. No. 5,554,902 (although grain orientation is not important). The alternator has a central axial opening and a fan 58 which is rotated by central drive shaft 63.

Surrounding opening 50 is shroud 60 which likewise has an opening 62 which permits air flow to go from the first opening 50 through the opening 62 in the shroud into the central compartment. Alternator 56 is bolted to motor 54 and is aligned with the opening 62 to pull air through opening 50 and shroud 62. The drive shaft 63 is connected to motor 54 which drives alternator 56. Air passes through the alternator's out openings in the housing as shown by arrows.

Motor 54 is supported from the base 57 of housing 14 on a motor mounting plate 59. This is supported from the base 57 by four engine mounts 61 (only two are shown). Fixed to the bottom side of plate 59 is a thermostat controlled pad heater 64 such as a Watlow brand heater which operates off of line voltage. This maintains the engine at an operating temperature when needed.

One preferred motor is a Briggs & Stratton 14 HP Motor Model 294447 type 1201A1 which is powered by natural gas. The motor could be a gasoline or diesel powered motor or one powered by propane. The motor itself includes an exhaust system or muffler 66 which rests on a shelf 65 above the alternator shroud 60. The exhaust pipe 67 extends from muffler 66. The engine also includes a fan 68 which is aligned with opening 52. Covering wall 46 around this opening is an insulating pad 69 which absorbs vibration and sound.

Air will exhaust from the central compartment 40 into a plenum 76 in the top 24 of housing 14. The plenum 76 is formed from a first side wall 78, a second side wall 80 and a back wall 82. These are covered by a bottom wall 84. As shown by arrow 83, this provides an air passage from a downwardly extended exhaust shroud 86 to a screened air opening 87 which extends forwardly through the front overhang portion 28.

The exhaust shroud 86 opens through the bottom wall 84 and includes a first, second, third and fourth walls 88, 90, 92 and 94. The shroud 86 is designed to cover the exhaust muffler 66 of motor 54 when the top 24 is covering the housing 14. The shroud 86 further includes an inner wall 96. A bottom panel extends from wall 88 to wall 96 forming a compartment 95 which also leads to plenum 76 and then opening 87. Wall 96 has an opening 98 which aligns with exhaust pipe 67 so that engine exhaust is vented directly into compartment 95 and from there into plenum 76.

The first side compartment 42 of housing 14 contains a cabinet 102 which protects the internal electrical components of the generator 12. The cabinet 102 includes an access door 104 and first and second side wall and top wall 103, 105 and 107. Second side wall 105 includes a lower air inlet 106 which allows air to flow from inside the compartment to inside the cabinet 102. The cabinet stores electric components 108 such as any electrical sensors and the like which will cause the generator to activate or deactivate. Exemplary electronics for such a generator are disclosed more particularly in Faugher, U.S. Pat. No. 5,990,575 the disclosure of which is incorporated herein by reference. Other electrical schematics can also be used depending upon the particular intentions or uses of the generator and these components per se form no part of the present invention.

The terminal strip 111 are housed in shroud 60 immediately in front of opening 50. This provides added cooling for the power connections.

The front wall 109 of the cabinet 102 also holds a switch 110 which enables one to manually turn on or off the electrical generator 12. Door 20 connected by hinges to housing 14 allows one to access the first compartment and thereby access cabinet 102 through access door 104.

The first side compartment 42 is covered by the top 24. The compartment itself is open to the top. Top 24 in turn provides an open air path to the first overhang portion 30. This air path is separated from plenum 76 by wall 78. Overhang portion 30 has a downwardly directed screened air inlet 120 which provides an air passage from the exterior of housing 14 into the first side compartment 42. The air can then flow through the lower air inlet 106 into the cabinet 102 and through the opening 50 into the central compartment 40.

Second side compartment 46 has a similar air flow design to that for the first side compartment 42. The second side compartment 46 likewise has an access door 22. This compartment 46 houses a gas supply 128. This could also be a fuel supply if diesel or gasoline were used to power the motor. This compartment 44 also includes batteries 130 which are used to start the motor when power generation is necessary. Again the second compartment is covered by the top 24 of the housing 14. Compartment 46 is open to the top 24 which provides a passageway from the compartment 46 to the second overhang portion 32. Overhang portion 32 also has a downwardly directed screened air inlet 122 thus allowing air to be pulled from the inlet into the second compartment where it can then flow through the second opening 52. Again this air passage is separated from plenum 76 by wall 80.

In operation whenever the generator detects a need for electrical power, the motor 54 will start which in turn will cause the alternator 56 to rotate generating electricity. The alternator also includes a central fan 58 which will pull air into the central compartment from the first side compartment 42. The air will flow from the first overhang portion 30 into the first side compartment 42 into the cabinet 102 through first opening 50 into the central compartment 40.

Likewise air will be pulled into the central compartment from the second side compartment 46 through the second opening 52. Again air will flow through the screened air inlet 122 in the second side overhang 32 into the top of the second side compartment 46 and through the second opening 52.

By drawing air in through these overhang portions, water is not admitted into the system thereby preventing damage to the housed components. The motor itself will generate both heat and exhaust gases. The exhaust gases from muffler 66 will be forced through hole 98 into compartment 95 in the exhaust shroud 86 through plenum 76 and out of the housing through the opening 87 in the front overhang portion 28. Additional air is forced by convection and pressure differential around muffler 66 into shroud 86 and out plenum 76.

If one wishes to access the generator, one can do so by lifting the top 24 which will rotate on hinges 26. A bracket and support rod 132 is provided to hold the top in a raised position. Likewise access doors 20, 22 and 38 can be removed to access the central compartment and the two side compartments. A backside (not shown) is also provided.

The present invention provides superior cooling for not only the alternator and the motor but also all the electrical components positioned in cabinet 102. It separates the exhaust from other components and forces it directly into a plenum which directs the air away from the unit. The top portion of the cabinet likewise prevents water from accessing the inside of the housing. Thus the present invention provides active cooling of the components housed within the housing and at the same time protects it from water.

If necessary, additional active cooling can be used to provide additional cooling. For example, a fan can be positioned in the plenum 76 to force additional air out of the system. Additional openings or louvers can be provided into the first and second compartments again to provide more air flow. Further there are other minor modifications that can be made by those skilled in the art without departing from the present invention.

Therefore the invention itself should only be defined by the appended claims wherein we claim:

1. A power supply having a housing, said housing including first and second inlet chambers and a central chamber;

a first wall separating said first chamber from said central chamber and a second wall separating said second chamber from said central chamber;

a cover, said cover extending over said first, second and central chambers, an air inlet through said cover into said first chamber and a second air inlet through said cover into said second chamber, an air outlet from said central chamber through said cover; and a first opening in said first wall and an alternator having a fan positioned adjacent said first wall whereby said fan pulls air from said first chamber through said first opening into said central chamber, a motor adapted to power said alternator, said motor having a fan positioned in said central chamber and adjacent a second opening in said second wall whereby said fan pulls air from said second chamber into said central chamber through said second opening.

2. The power supply claimed in claim 1 further comprising a plenum in said cover respectively, said plenum having an opening into said central chamber and leading to said air outlet respectively, said opening adjacent an exhaust of said motor.

3. The power supply claimed in claim 2 wherein said plenum overhangs a front wall of said housing.

4. The power supply claimed in claim 3 wherein said plenum includes an exhaust shroud covering the exhaust of said motor, said shroud leading to the interior of said plenum.

5. The power supply claimed in claim 4 wherein said exhaust shroud includes a subchamber leading into said plenum having an exhaust opening which is directed into said subchamber.

6. The power supply claimed in claim 1 wherein said cover includes an overhang portion, said overhang portion having said first air inlet, said air inlet directed through a chamber in said cover into first side chamber.

7. The power supply claimed in claim 6 wherein said cover includes a second overhang portion said second overhang portion having said second air inlet, said second air inlet extended through a chamber in said cover into said second side compartment.

8. The power supply claimed in claim 6 wherein said first side compartment includes a cabinet, said cabinet housing electronic components of said alternator, said cabinet having a side wall said side wall, having an opening wherein said cabinet covers said first opening in said first wall whereby air flowing in through said first side compartment passes through said cabinet into said central compartment.

9. A power supply having a housing said housing covering a motor and an electrical generator in said housing;

said housing having side walls and a top;

said top having an overhang portion extended beyond said side walls;

an air exhaust comprising a plenum above said motor, said plenum leading to a downwardly directed opening in said overhang portion;

at least one downwardly extended air inlet in said overhang portion said air inlet leading through said top into said housing.

10. The power supply claimed in claim 9 comprising a second downwardly extended air inlet in said overhang portion said air inlet leading through said top into said housing.

11. The power supply claimed in claim 10 wherein said first air inlet leads into a first side chamber of said housing and said second air inlet leads to a second side chamber in said housing and wherein an air outlet extends from a third central chamber in said air inlet.

12. The power supply claimed in claim 9 further including an exhaust shroud covering an exhaust portion of said motor, said shroud leading to said plenum and directing exhaust gas from said motor to said plenum.

* * * * *